United States Patent [19]

Kassabov et al.

[11] Patent Number: 4,463,441
[45] Date of Patent: Jul. 31, 1984

[54] REGISTER ARITHMETIC DEVICE

[75] Inventors: Nikola K. Kassabov; Lyudmil G. Dakovski, both of Sofia, Bulgaria

[73] Assignee: V M E I "Lenin", Sofia, Bulgaria

[21] Appl. No.: 284,991

[22] Filed: Jul. 20, 1981

[30] Foreign Application Priority Data

Jun. 22, 1980 [BG] Bulgaria .................................. 48568

[51] Int. Cl.³ ............................................. G06F 7/48
[52] U.S. Cl. ..................................... 364/900; 364/736
[58] Field of Search ........................ 364/200, 900, 736

[56] References Cited

U.S. PATENT DOCUMENTS

| 3,391,390 | 7/1968 | Crane et al. | 364/736 |
| 3,787,673 | 1/1974 | Watson et al. | 364/200 |
| 4,025,771 | 5/1977 | Lynch et al. | 364/736 |
| 4,159,520 | 6/1979 | Prioste | 364/200 |
| 4,206,503 | 6/1980 | Woods et al. | 364/200 |
| 4,224,676 | 9/1980 | Appelt | 364/200 |

OTHER PUBLICATIONS

Alexandridis, Bit-Slice Microprocessor Architecture, Jun. 1978, "Computer".

Primary Examiner—Gareth D. Shaw
Assistant Examiner—Tim A. Wiens
Attorney, Agent, or Firm—Karl F. Ross; Herbert Dubno

[57] ABSTRACT

An arithmetic device having successive arithmetic registers connected in cascade, with buffer registers at each end of the cascade. An information exchange circuit bidirectionally connected to all the arithmetic registers for controlling information transfer therebetween such that the first register is connected to all of the other registers and every other register is also connected to a preceding and a succeeding register.

1 Claim, 6 Drawing Figures

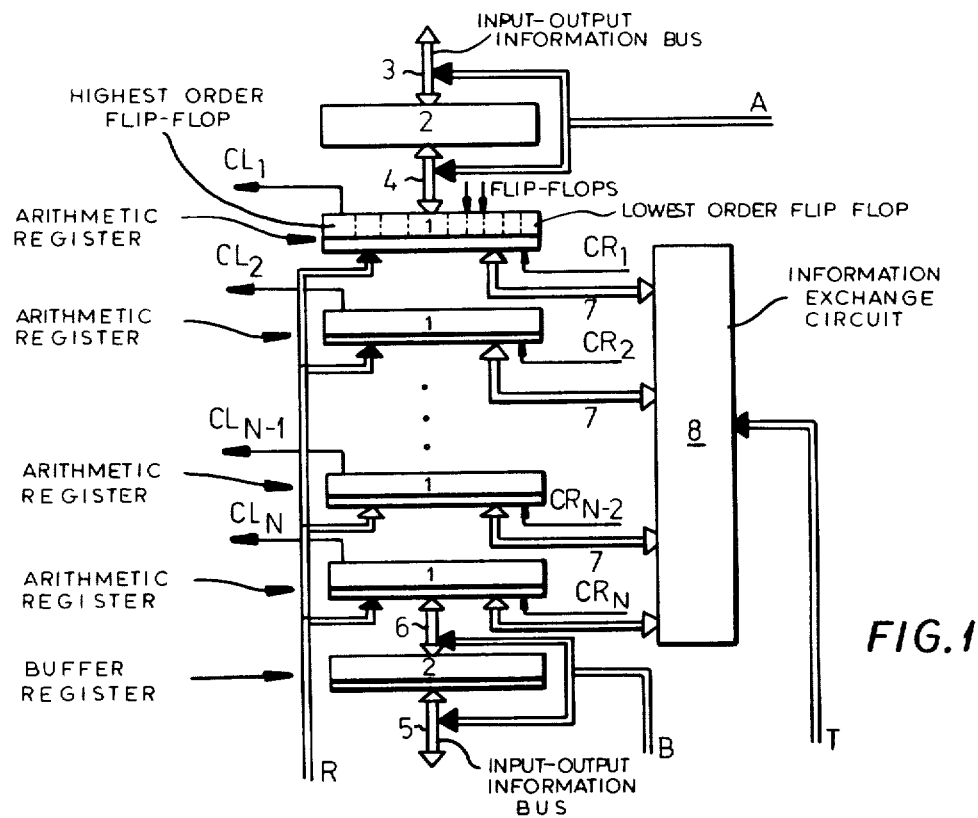
FIG.1
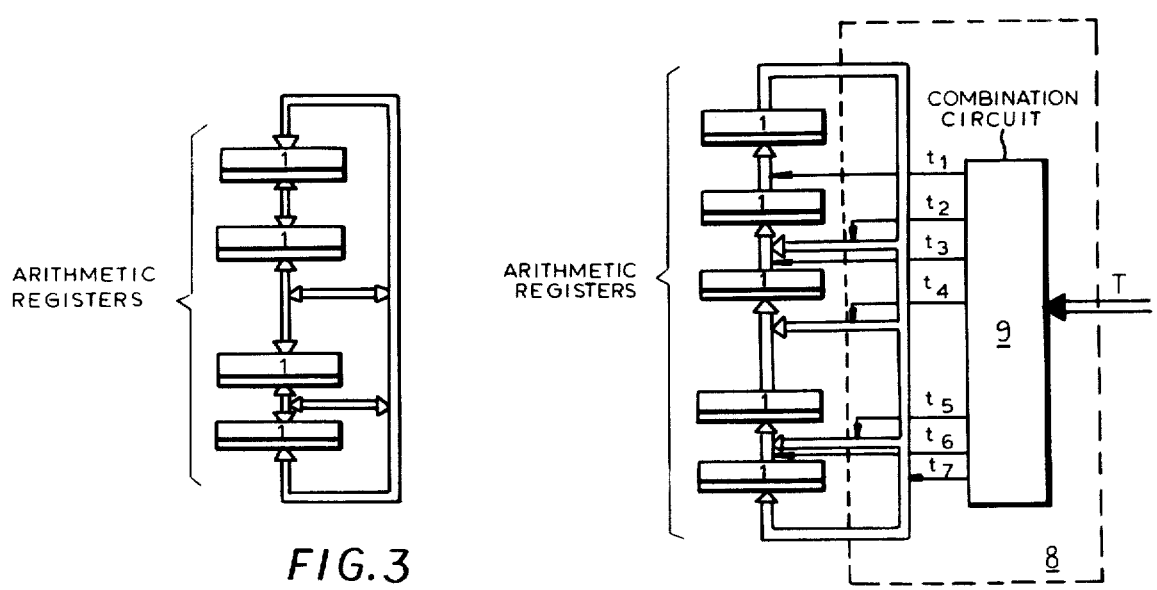
FIG.3
FIG.2

REGISTER ARITHMETIC DEVICE

FIELD OF THE INVENTION

This invention relates to a register arithmetic device with the possibility of word-size expansion which can be used for data processing and temporary data storage and is applicable in processors for large, mini- and macro-computers, as well as in independent digital devices for computer engineering and automation purposes.

BACKGROUND OF THE INVENTION

A known word-size expandable microprocessor comprises registers, arithmetic-logic device, input, output information and control buses and buses for input and output transfer; all components of the microprocessor are interconnected in a fixed manner.

A drawback of this microprocessor is that it is possible with it to perform only one operation at a given moment. Moreover, the transfer of information between the registers is also effected sequentially, i.e. only one transfer is effected at a given moment. The possibility of using these microprocessors to assemble large systems by their combination, where simultaneously data is exchanged and is processed, is quite limited.

OBJECT OF THE INVENTION

It is, therefore, an object of this invention to provide a register arithmetic device with the possibility of word-size expansion and parallel performance of several uniform operations on different operands with parallel exchange and with improved capacity for the assembly of large digital systems by the connection of several such devices.

SUMMARY OF THE INVENTION

This object is achieved by a register arithmetic device comprising registers, an operational bus for presetting the operation code in the device, two input-output information buses, input and output buses for word-size expansion, according to which the registers are N number of n-bit uniform arithmetic registers and two buffer registers for input and output of data in the device and for connection with other devices, where the first buffer register is connected to the first input-output information bus, as well as to the first arithmetic register by means of control buses for control of the first buffer register, while the second buffer register is connected to the second input-output information bus, as well as to the last arithmetic register by means of control buses for the control of the second buffer register, while the arithmetic registers are interconnected by a system for control of the exchange between the registers, to which there are connected the control inputs of the device for control of the exchange, and the operational input buses of the device are connected simultaneously to all arithmetic registers, the low-order and high-order flip-flops of which are connected to a respective input and output bus of the device for word-size expansion of all 2N such buses of the device.

The information output of each arithmetic register, from the second to the last, is connected to the information input of the previous register, to which there is connected the output of the first arithmetic register by means of a resolving combination circuit with a number of inputs equal to $|\log 2(N+1)|$, which are also control inputs of the device for control of the exchange between the registers. The arithmetic registers are also provided with feedback connections with respect to the transmission of information between the registers, and the number of buses for control of the exchange is equal to $|\log 2(2N+1)|$, while the arithmetic register comprises a n-bit flip-flop block, the outputs of whose flip-flops representing the output information bus of the arithmetic register and which is connected to a combination logic circuit with n input information buses, which are the input information buses of the arithmetic register, and to three operational buses for presetting the code of the operations.

The advantage of the device according to the invention is that it permits simultaneous performance of N equivalent operations on the N operands in the arithmetic registers, including one- and two-positional operations. By control of the exchange between the registers it is possible to achieve an arbitrary parallel exchange between. The buffer registers provide great possibilities for simultaneous input, output of data in the device with different organizations of data, such as LiFO, FiFO. The device can also process sequential data.

BRIEF DESCRIPTION OF THE DRAWING

For a better understanding of the invention, reference should be made to the accompanying drawings in which there is illustrated a preferred embodiment of the invention. In the drawing:

FIG. 1 is a block diagram of the device;

FIG. 2 is a block diagram of the block for control of the exchange between the registers of the device;

FIG. 3 is a second variant of the block for control of the exchange between the registers;

SPECIFIC DESCRIPTION

Figure 4:
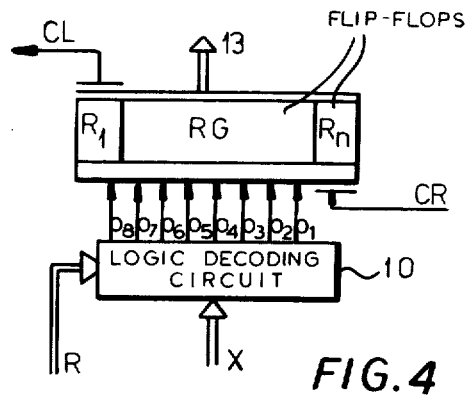
FIG. 4 is a block diagram of an arithmetic register of the device.

The register arithmetic device according to the invention comprises N n-bit arithmetic registers 1, which can perform a determined number of arithmetic and logic operations, two buffer registers 2 the first of which is connected to the first input-output n-digit bus 3, as well as to the first arithmetic register 1 by means of the information bus 4, whose connections are resolved by their connection to control buses A for control of the first input-output buffer register, while the second buffer register 2 is connected to the second input-output bus 5, as well as to the last arithmetic register 1 with information bus 6 by connection to the control second buffer register buses B. The data inputs and outputs 7 of all arithmetic registers are connected together by means of a control block 8 for the exchange of register contents, to which there are connected the control inputs T of the device for the control of exchange and which resolve different simultaneous connections between all registers. The inputs of the lowest-order flip-flops of the arithmetic registers are connected each to a one-digit input bus of the device, i.e buses $CR_1, CR_2 \ldots CR_N$, while the highest-order flip-flops of the arithmetic registers are connected respectively to one of the output buses of the device $CL_1, CL_2, \ldots CL_N$. The operational input buses R for presetting the code of operation in the device are connected simultaneously to all arithmetic registers 1.

The control block 8 for the exchange of register contents of the device is shown in FIGS. 2 and 3. The diagram in FIG. 2 comprises the arithmetic registers 1 of the device, the combination circuit 9 and the input $|\log 2(N+1)|$-digit bus T for control of the exchange, one control code resolving the simultaneous connection of all registers 1. The information inputs and outputs of registers 1 are interconnected as follows:

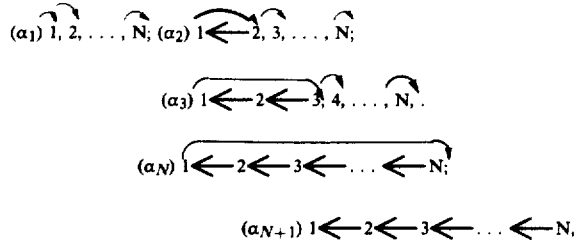

where 1, 2 ..., N, are the numbers of registers 1, while the arrows indicate the connection of the output of the first register to the input of the register whose number the point of the arrow indicates. The outputs $t_1$ to $t_7$, which are outputs of logic elements of the combination circuit 9 perform the logic functions:

$t_1 = a_2 V a_3 V a_{N+A}; t_2 = = 2; t_3 = a_3 V \ldots V a_{N+};$ $t_4 = a_3; t_5 = a_{N-N}; t_6 = a_{N+} a_{N+N}; t_7 = a_N,$ and are connected to the information buses of the registers for connection of each register, with the exception of the first one, to its adjacent one and to the first one. In the embodiment shown in FIG. 3, the arithmetic registers 1 are connected, besides the manner shown in the embodiment illustrated in FIG. 2, also to the connections:

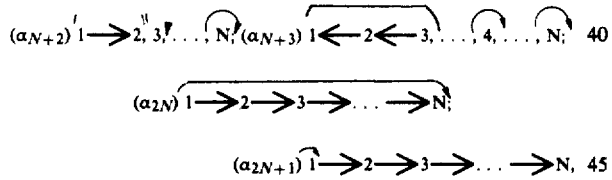

each of which is resolved by connection to one output control bus of the combination circuit 9.

The arithmetic register 1 of the device shown in FIG. 4 comprises RG memory components-flip-flops $R_l$ to $R_n$, a logic decoding circuit 10, which is connected to the operational three inputs R of the device and the information n-bit bus X of the register, while the outputs of this circuit 10 from $O_1$ to $O_8$ are control inputs of the RG flip-flop block for performing respectively the operations: recording/reading; move to the left of one digit; addition with 1; inversion; sum by module two; disjunction conjunction; addition. The cutput of the first flip-flop $R_1$ and the input of the last flip-flop $R_n$ are connected respectively to the output CL and the input CR of the device.

Figure 5:
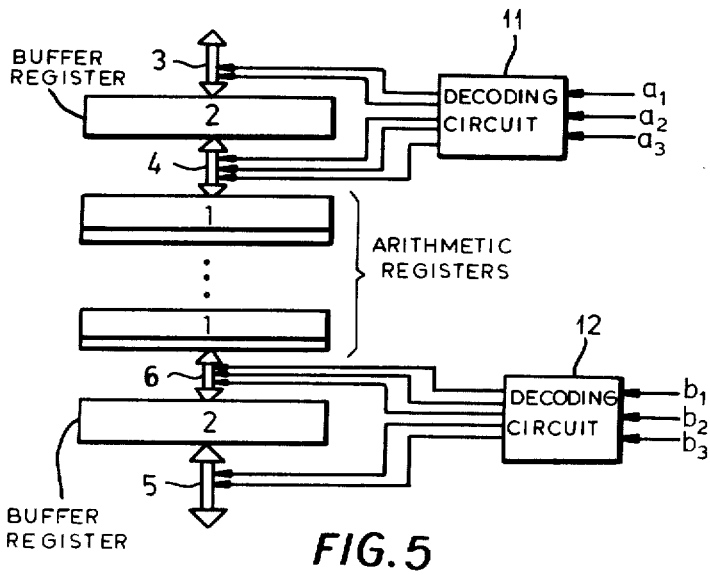
FIG. 5 is a diagram of the input-output buffers of the device.

The input-output buffers of the device are shown in FIG. 5. The first input-output bus 3 and the bus 4, connecting the first buffer register 2 to the first arithmetic register 1, are connected each to three outputs of the decoding circuit 11, to which there are connected the input buses $a_1, a_2, a_3$, controlling the first buffer. The second buffer register 2 is connected in a similar way to the second input-output bus 5 and the last arithmetic register 1 each being connected to three outputs of the decoding circuit 12, whose inputs are connected to three buses $b_1, b_2, b_3$, controlling the second buffer. The input-output operations only for the first buffer register are described in Table II.

The operation of the register arithmetic device according to the invention is as follows:

When feeding an operation code to the operational buses R of the device, all arithmetic registers perform this operation, the first operand being the content of the register, while the second operand is the content of its input operation bus. For the realization of the arithmetic register shown in FIG. 4, the eight operations are shown in Table I. Thus, for example, if the code of the operation is 111 and the exchange code fed to the exchange control bus T is for performing a parallel connection

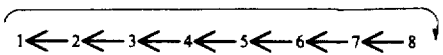

when $N=8$, then the following operations are performed in the device:

$<i> + <i+1> + CR_1 \to i$ (for $i-1, 2, \ldots,$
$7)<1> + <8> + CR_8 \to 8.$

The exchange code indicates which will be the second operand of each register. When feeding an operation code for exchange to the control bus T, there is realized one of the possible simultaneous connections (transformations) between all arithmetic registers. Thus, for example when feeding a $|\log 2(N+1)|$-bit code to the control bus T of the embodiment shown in FIG. 2, there is performed one of all $N+1$ transformations. An arbitrary exchange between the registers can be effected in the device when feeding a code for zero operation (reading/recording) to the operation buses R and feeding a fixed code sequence to the buses T which control the exchange, by previously arranging the desired transformation in a sequence of the base transformations performed at one control code. For example, for realizing the transformation

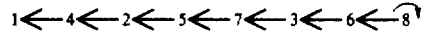

is is necessary to feed a control sequence $Y_9, Y_5, Y_7$, the control code $Y_i$ realizing a base transformation $a_i$. When feeding one control code to the buses for control of the buffer registers 2, there is performed one input-output operation of the device, as shown in Table II, which relates to the first buffer. The table for the second buffer is similar.

The device according to the invention allows contribution of a device with $k \times n$ capacity with the same operations by connecting a number k of n-bit devices by means of the inputs CR and the outputs CL of the device.

Figure 6:
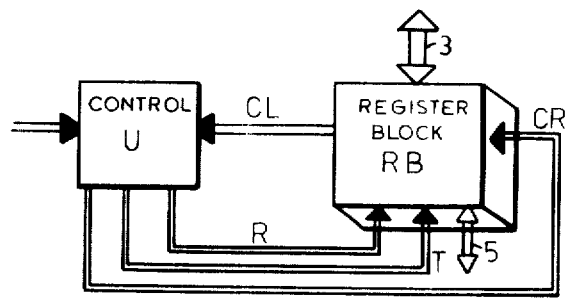
FIG. 6 is a schematic diagram of a processor made up of devices according to the invention.

A processor build up of devices according to the invention, which form a register block RB and a control device U connected to the register block RB, is shown in FIG. 6.

The advantages of the register arithmetic device allow its use for different functions in a digital system as: superoperative register device for temporary saving of data and with possibility for their processing with different organizations of the data, such as LiFO, FiFO and ALU for parallel operations (such as simultaneous multiplication of binary numbers, for example).

What we claim is:

1. An arithmetic register device which comprises:

N number of n-bit arithmetic registers each having a respective lowest order flip-flop, a highest order flip-flop and intermediate order flip-flops between said lowest order flip-flop and said highest order flip-flop, a first buffer register connected to a first of said arithmetic registers for bidirectional information transfer therebetween, said first buffer register being additionally connected to a first input-output information bus;

a second buffer register connected to the Nth arithmetic register for bidirectional transfer of information therebetween, said second buffer register being additionally connected to a second input-output information bus;

respective first and second control buses connected to said buffer registers for controlling the transfer between said buffer registers and the arithmetic registers connected thereto;

an information exchange circuit bidirectionally connected to all of said arithmetic registers for controlling information transfer therebetween such that the first register is connected to all of the other registers and every other register is also connected to a preceding and a succeeding register;

an operational input bus unidirectionally connected to all of said arithmetic registers for presetting operational codes for the computation of information in said arithmetic registers; and one-digit input buses respectively connected to the control ports of the lowest order flip-flops of each of said arithmetic registers, and respective output buses connected to the control ports of the highest order flip-flops of each of said arithmetic registers to enable word-size expansion of the information words stored in said arithmetic registers.

* * * * *